(12) United States Patent
Zha

(10) Patent No.: US 11,112,646 B2
(45) Date of Patent: Sep. 7, 2021

(54) THIN BACKLIGHT MODULE AND MANUFACTURING METHOD THEREOF

(71) Applicant: WUHAN CHINA STAR OPTOELECTRONICS TECHNOLOGY CO., LTD., Wuhan (CN)

(72) Inventor: Guowei Zha, Wuhan (CN)

( * ) Notice: Subject to any disclaimer, the term of this patent is extended or adjusted under 35 U.S.C. 154(b) by 316 days.

(21) Appl. No.: 16/336,105

(22) PCT Filed: Jan. 3, 2019

(86) PCT No.: PCT/CN2019/070257
§ 371 (c)(1),
(2) Date: Mar. 24, 2019

(87) PCT Pub. No.: WO2020/107644
PCT Pub. Date: Jun. 4, 2020

(65) Prior Publication Data
US 2021/0181577 A1    Jun. 17, 2021

(30) Foreign Application Priority Data
Nov. 28, 2018  (CN) .......................... 201811430360.X

(51) Int. Cl.
*G02F 1/13357* (2006.01)
*G02F 1/1335* (2006.01)
(52) U.S. Cl.
CPC .. *G02F 1/133603* (2013.01); *G02F 1/133605* (2013.01); *G02F 1/133606* (2013.01); *G02F 1/133614* (2021.01)

(58) Field of Classification Search
CPC ................ F21K 9/64; G02F 1/133603; G02F 1/133605; G02F 1/133606; G02F 1/133614
See application file for complete search history.

(56) References Cited

U.S. PATENT DOCUMENTS

| | | | |
|---|---|---|---|
| 7,726,828 B2 * | 6/2010 | Sato ........................ | G09F 13/22 362/97.3 |
| 8,507,926 B2 * | 8/2013 | Weng ................ | G02F 1/133603 257/88 |
| 9,140,929 B2 * | 9/2015 | Bae ...................... | G02B 6/0078 |
| 9,864,124 B2 * | 1/2018 | Cha ...................... | G02F 1/1336 |
| 10,901,263 B2 * | 1/2021 | He .................... | G02F 1/133609 |

(Continued)

*Primary Examiner* — Zheng Song

(57) ABSTRACT

A thin backlight module and a manufacturing method of the thin backlight module are provided. The thin backlight module includes a drive substrate, multiple light emitting sources, a fluorescence layer, and multiple particle microstructures. The light emitting sources are arranged in an array on the drive substrate. The surface micro-structures are arranged on a surface of the fluorescence layer. Each surface micro-structure is arranged corresponding to each light emitting source. Each particle micro-structure is arranged corresponding to each surface micro-structure. Each particle micro-structure and each surface micro-structure together form a guiding layer for dispersing light from a corresponding one of the light emitting sources. Thereby, a smaller light mixing distance and an ultra-thin backlight module thickness are achieved.

8 Claims, 3 Drawing Sheets

(56) References Cited

U.S. PATENT DOCUMENTS

| | | | |
|---|---|---|---|
| 2007/0058359 A1* | 3/2007 | Saitoh | G02F 1/133606 362/97.3 |
| 2009/0213618 A1* | 8/2009 | Lai | G02B 6/0041 362/606 |
| 2010/0244058 A1* | 9/2010 | Weng | G02F 1/133603 257/88 |
| 2011/0050556 A1* | 3/2011 | Bae | G02B 6/0021 345/102 |
| 2012/0162966 A1* | 6/2012 | Kim | G02B 6/0073 362/97.1 |
| 2012/0250350 A1* | 10/2012 | Kim | G02F 1/133606 362/606 |
| 2015/0219936 A1* | 8/2015 | Kim | G02F 1/133602 362/97.1 |
| 2019/0011780 A1* | 1/2019 | Wang | G02F 1/133602 |
| 2019/0227382 A1* | 7/2019 | Watanabe | F21S 2/00 |
| 2020/0124919 A1* | 4/2020 | Yang | G02F 1/133611 |
| 2020/0249530 A1* | 8/2020 | He | G02F 1/133606 |

\* cited by examiner

THIN BACKLIGHT MODULE AND MANUFACTURING METHOD THEREOF

1. FIELD OF DISCLOSURE

The present invention relates to a field of flexible display devices and in particular, to a thin backlight module and a manufacturing method thereof.

2. DESCRIPTION OF RELATED ART

Due to the trend toward lighter, thinner, shorter, and smaller electronic products, the concept of thinning has become a main goal that display devices have to continuously work on. Due to the thinning trend, a thickness of the display device is limited, and a thickness of a backlight module is one of the key factors that decides thinness of the display device. LED backlight modules have been widely used in liquid crystal displays. Existing LED backlight modules are mainly categorized into two types, and one of the two types is an edge-lit type and the other is a direct-lit type.

The direct-lit LED backlight module has advantage such as having a narrow bezel, and is widely used in large-size displays, but also increases the thickness. If small-size mini-LEDs are spaced at a smaller pitch, a light mixing distance can be smaller, and therefore a small-size direct-lit backlight module can be light, thin, and narrow. However, the smaller pitch means that a single backlight module needs more mini-LEDs, and consequently production costs increase.

In addition, conventional small-sized display uses an edge-lit LED backlight source. Since the LED itself has a certain thickness, it is necessary to use a light guide plate or the like to uniformly diffuse the light to prevent occurrence of a hotspot phenomenon near a light emitting source, so a certain light mixing distance is required. However, when the light mixing distance is shortened to reduce the thickness, the backlight efficiency is also dramatically reduced. Therefore, it is a challenge to effectively shorten the light mixing distance to achieve requirements for full screens without increasing production costs.

SUMMARY

Conventional small-size display adopts an edge-lit LED backlight source. Since the LED itself has a certain thickness, it is necessary to use a light guide plate or the like to uniformly diffuse the light to prevent occurrence of a hotspot phenomenon near a light emitting source, so a certain light mixing distance is required. However, when the light mixing distance is shortened to reduce the thickness, the backlight efficiency is also dramatically reduced. Therefore, it is a challenge to effectively shorten the light mixing distance to achieve requirements for full screens without increasing production costs.

Accordingly, the present invention provides a thin backlight module and a manufacturing method thereof, which solve the problem that the thickness of the conventional backlight module is increased, the light mixing distance is insufficient, and a front light of the light emitting source cannot be maximized.

An objective of the present invention is to provide a thin backlight module and a manufacturing method thereof, which can allow a smaller light mixing distance and realize an ultra-thin thickness of a backlight module by providing a surface micro-structure and a particle micro-structure on a surface of a fluorescence layer to form a guiding layer for scattering light from a light emitting source.

Accordingly, the present invention provides a thin backlight module, comprising:

a drive substrate;

a plurality of light emitting sources, the light emitting sources being arranged in an array on the drive substrate;

a plurality of reflecting layers disposed on the drive substrate, each reflecting layer being disposed between each two adjacent ones of the light emitting sources;

a fluorescence layer, a plurality of surface micro-structures being disposed on a surface of the fluorescence layer, each of the surface micro-structures being disposed corresponding to each of the light emitting sources;

a diffusing layer disposed on the fluorescence layer;

a top coat layer disposed on the diffusing layer; and a plurality of particle micro-structures, each of the particle micro-structures being disposed corresponding to each of the surface micro-structures, wherein each particle micro-structure and each surface micro-structure together form a guiding layer for dispersing light from a corresponding one of the light emitting sources.

According to one embodiment of the present invention, a size of each of the light emitting sources ranges from 100 μm to 1000 μm, and a distance between each two adjacent ones of the light emitting sources ranges from 100 μm to 2000 μm.

According to one embodiment of the present invention, each particle micro-structure comprises haze particles of a specific concentration, the concentration ranges from 10% to 90%, and a thickness of each particle micro-structures ranges from 1 μm to 100 μm.

According to one embodiment of the present invention, a center of each surface micro-structure is disposed corresponding to a center of a corresponding one of the light emitting sources, and an inclined surface or a curved surface is defined between the center of each surface micro-structure and a surface of the fluorescence layer.

According to one embodiment of the present invention, a length from a center of each surface micro-structure to the surface of the fluorescence layer ranges from 50 μm to 500 μm, and a thickness of each surface micro-structure ranges from 5 μm to 100 μm.

According to one embodiment of the present invention, each of the light emitting sources is a mini LED or a micro LED; the fluorescence layer comprises a light transmissive adhesive and comprises, mixed with the light transmissive adhesive, one selected from a group consisting of a plurality of fluorescent particles, a plurality of quantum dot particles, or a plurality of haze particles; and the drive substrate is a flexible printed circuit board (FPC) or a printed circuit board (PCB).

The present invention provides a thin backlight module, comprising:

a drive substrate;

a plurality of light emitting sources, the light emitting sources being arranged in an array on the drive substrate;

a fluorescence layer, a plurality of surface micro-structures disposed on a surface of the fluorescence layer, each of the surface micro-structures being disposed corresponding to each of the light emitting sources; and a plurality of particle micro-structures, each of the particle micro-structures being disposed corresponding to each of the surface micro-structures, wherein each particle micro-structure and each surface micro-structure together form a guiding layer for dispersing light from a corresponding one of the light emitting sources.

According to one embodiment of the present invention, each particle micro-structure comprises haze particles of a specific concentration, the concentration ranges from 10% to 90%, and a thickness of each particle micro-structures ranges from 1 μm to 100 μm.

According to one embodiment of the present invention, a center of each surface micro-structure is disposed corresponding to a center of a corresponding one of the light emitting sources, and an inclined surface or a curved surface is defined between the center of each surface micro-structure and the surface of the fluorescence layer.

According to one embodiment of the present invention, a length from a center of each surface micro-structure to the surface of the fluorescence layer ranges from 50 μm to 500 μm, and a thickness of each surface micro-structure ranges from 5 μm to 100 μm.

According to one embodiment of the present invention, each of the light emitting sources is a mini LED or a micro LED; the fluorescence layer comprises a light transmissive adhesive and comprises, mixed with the light transmissive adhesive, one selected from a group consisting of a plurality of fluorescent particles, a plurality of quantum dot particles, or a plurality of haze particles; and the drive substrate is a flexible printed circuit board (FPC) or a printed circuit board (PCB).

The present invention further provides a manufacturing method of a thin backlight module, comprising steps as follows:

S10: providing a drive substrate;

S20: arranging a plurality of light emitting sources on the drive substrate;

S30: developing a fluorescence layer on the light emitting sources, and hot-pressing a plurality of surface micro-structures on a surface of the fluorescence layer, wherein each of the surface micro-structures is disposed corresponding to each of the light emitting sources;

S40: developing a particle micro-structure on each of the surface micro-structures, wherein each particle micro-structure contains particles of a concentration, and each particle micro-structure and each surface micro-structure together form a guiding layer for dispersing light of a corresponding one of the light emitting sources.

According to one embodiment of the present invention, in step S30, each of the surface micro-structures is produced using a hot-press mold in such a manner that an inclined surface or a curved surface is defined between a center of each surface micro-structure to the surface of the fluorescence layer, wherein a length from a center of each surface micro-structure to the surface of the fluorescence layer ranges from 50 μm to 500 μm, and a thickness of each surface micro-structure ranges from 5 μm to 100 μm.

According to one embodiment of the present invention, a stencil process is utilized to coat or print a light transmissive fluid material on each surface micro-structure, wherein the concentration ranges from 10% to 90%, and a thickness of each particle micro-structure ranges from 1 μm to 100 μm.

According to one embodiment of the present invention, before step S30, the manufacturing method further comprises developing a plurality of reflecting layers, wherein each reflecting layer is disposed between each adjacent two of the light emitting sources.

The invention also has the following effects. In the invention, over the light emitting sources arranged in an array, the surface micro-structures are formed on the fluorescence layer by hot pressing, and then the particle micro-structures, each containing the haze particles of a specific concentration, are placed on each surface micro-structure by coating or printing. The particle micro-structures enhance the diffusion of light to maximize the light from the light-emitting sources to a surrounding area, expand a light shape (the shape of the light emission), and reduce a thickness of the backlight module. In addition, the surface micro-structures and the particle micro-structures with haziness are manufactured by a method compatible with conventional LED packaging processes, so is no need to use new equipment, thus having advantages such as saving production costs, improving brightness efficiency, and realizing a smaller light mixing distance.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Figure 1:
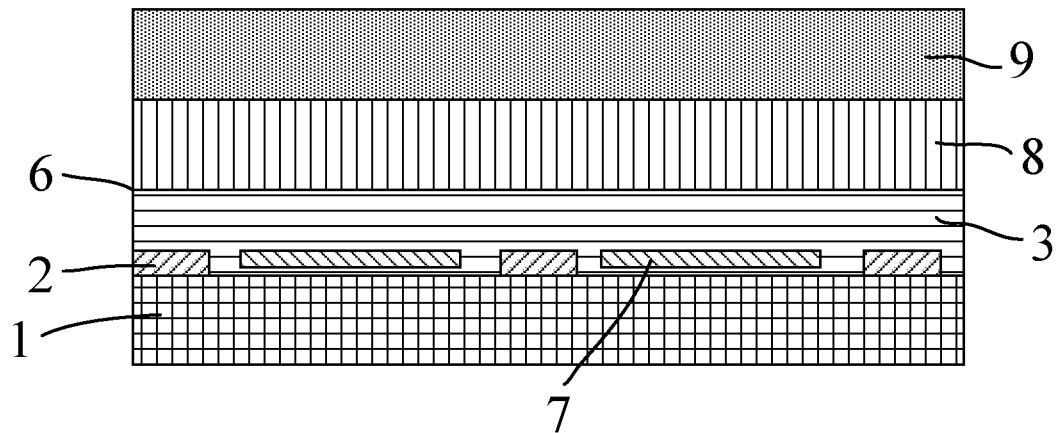
FIG. 1 is a cross-sectional view illustrating a thin backlight module according to the present invention.

References to "embodiments" in the detailed description mean that the specific features, structures or characteristics described in connection with the embodiments may be included in at least one embodiment of the invention. The same terms mentioned in different places in the specification are not necessarily limited to the same embodiment, but should be understood as independent or alternative embodiments to other embodiments. In view of the technical solutions disclosed in the embodiments of the present invention, those skilled in the art should understand that the embodiments described herein may have other combinations or modifications in accordance with the embodiments of the present invention.

Embodiments of the present disclosure are described in detail with reference to the accompanying drawings as follows. Directional terms such as up/down, right/left and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

Referring to FIGS. 1 to 4, the present invention provides a thin backlight module. The thin backlight module comprises a drive substrate 1, a plurality of light emitting sources 2, a fluorescence layer 3, and a plurality of particle microstructures 5. The thin backlight module shown in the drawings are preferably a direct-lit backlight module. However, in alternative embodiments, the thin backlight module can be an edge-lit backlight module or other suitable backlight module. Further, the micro-structure can be used in an edge-lit lightbar which is used as a linear backlight source, and in this case, the micro-structure is also beneficial to reduce a light mixing distance, thereby achieving a narrow bezel.

The light emitting sources 2 are arranged in an array on the drive substrate 1. A plurality of surface micro-structures 4 are disposed on a surface of the fluorescence layer 3. Each of the surface micro-structures 4 is disposed corresponding to each of the light emitting sources 2. Each of the particle micro-structures 5 is disposed corresponding to each of the surface micro-structures 4, wherein each particle micro-structure 5 and each surface micro-structure 4 together form a guiding layer 6 for dispersing light from a corresponding one of the light emitting sources 2.

Figure 2:
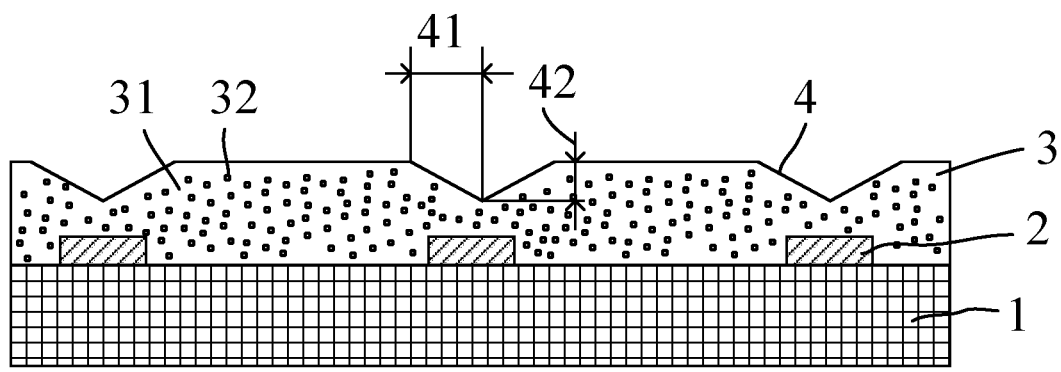
FIG. 2 is a schematic view illustrating a plurality of surface micro-structures of the thin backlight module according to the present invention.
Figure 3:
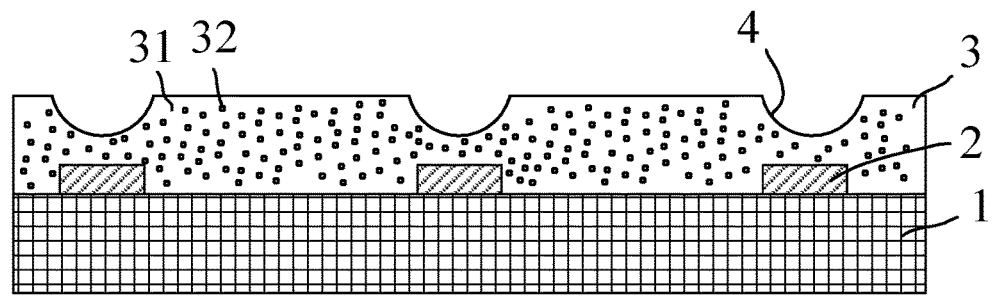
FIG. 3 is another schematic view illustrating the surface micro-structures of the thin backlight module according to the present invention.
Figure 4:
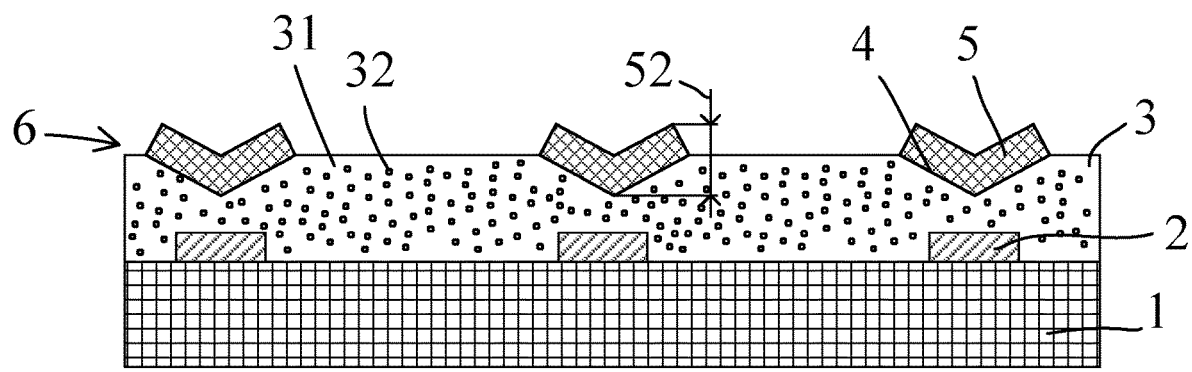
FIG. 4 is a schematic view illustrating a guiding layer of the thin backlight module according to the present invention.

In the embodiment shown in FIGS. 2 to 4, a center of each surface micro-structure 4 is disposed corresponding to a center of a corresponding one of the light emitting sources 2. That is, the center of each surface micro-structure 4 is symmetrically arranged corresponding to the center of each light emitting source 2. An inclined surface or a curved surface is defined between the center of each surface micro-structure 4 and the surface of the fluorescence layer 3. The inclined surface or the curved surface formed by the surface micro-structure 4 can effectively emit light to both sides, and prevent excessive light from being radiated back to the light emitting source 2 to cause secondary absorption.

A length 41 from the center of each surface micro-structure 4 to the surface of the fluorescence layer 3 is generally approximately equal to half a side length of the light emitting source 2, that is, 50 µm to 500 µm. A thickness 42 of each surface micro-structure 4 ranges from 5 µm to 100 µm. Each particle micro-structure contains haze particles of a specific concentration, and each haze particle is a transmissive liquid in the form of a droplet, so that the light from the light emitting source 2 is sufficiently diffused. The concentration herein ranges from 10% to 90%, and a thickness 52 of each particle micro-structure 5 ranges from 1 µm to 100 µm. The guiding layer 6 formed by each particle micro-structure 5 with haziness and each surface micro-structure 4 is beneficial to direct the light emitted from the light emitting source 2 to the surroundings, fully scatter the light and enhance an overall spatial distribution of the light, and effectively reduce the light mixing distance.

According to one embodiment of the present invention, each of the light emitting sources 2 is a mini LED or a micro LED, or other small-size LED. When the adjacent light emitting sources 2 are spaced at a larger pitch, the overall thickness of the backlight module is reduced. The fluorescence layer 3 comprises a light transmissive adhesive 31 and comprises, mixed with the light transmissive adhesive 31, one selected from a group consisting of a plurality of fluorescent particles 32, a plurality of quantum dot particles, or a plurality of haze particles. The light transmissive adhesive 31 is made of, for example, organic silica gel or the like. The drive substrate 1 is a flexible printed circuit board (FPC) or a printed circuit board (PCB); however, configuration may vary as required.

As shown in FIG. 1, the thin backlight module further comprises a plurality of reflecting layers 7, a diffusing layer 8, and a top coat layer 9. Each reflecting layer 7 is disposed on the drive substrate 1 and between each two adjacent ones of the light emitting sources 2, so as to increase refraction of light and reuse the light. The diffusing layer 8 is disposed on the fluorescence layer 3. The top coat layer 9 is disposed on the diffusing layer 8. The diffusing layer 8 and the top coat layer 9 are both techniques of conventional backlight modules, and therefore, a detail description thereof is omitted herein for brevity. A size of each light emitting source 2 ranges from 100 µm to 1000 µm, and a distance between each two adjacent ones of the light emitting sources 2 ranges from 100 µm to 2000 µm.

Figure 5:
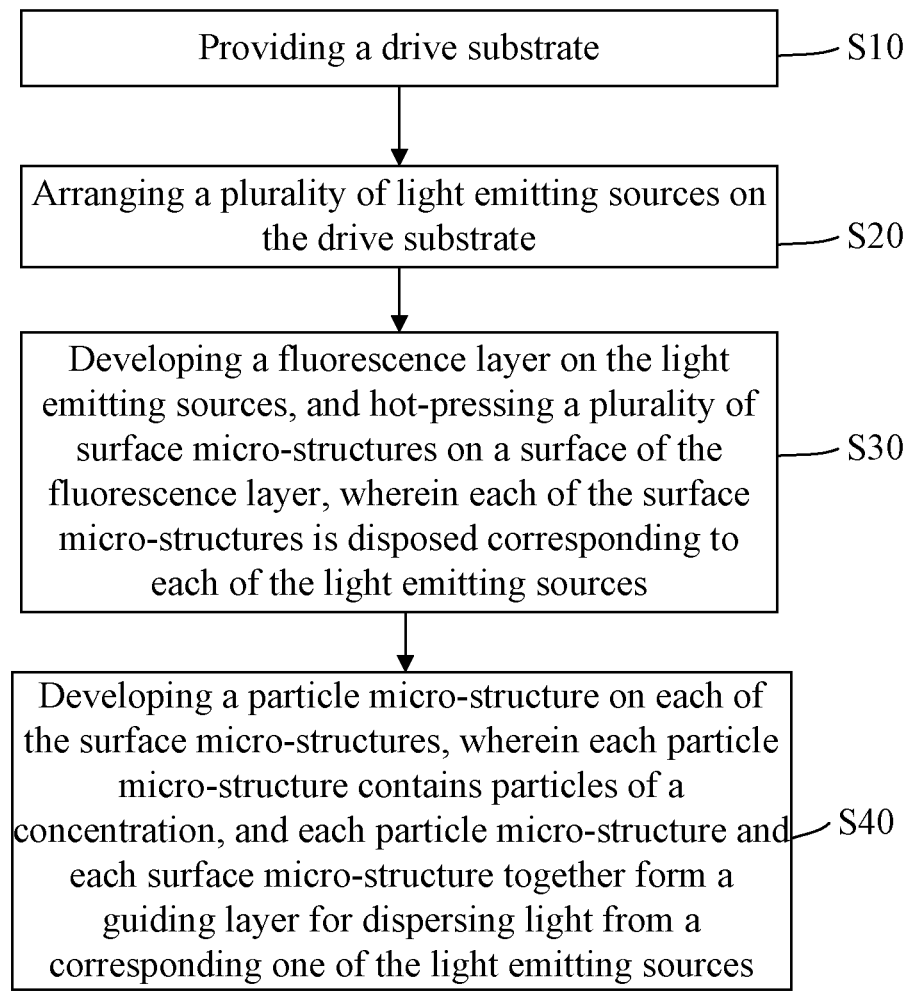
FIG. 5 is a process flow diagram illustrating a manufacturing method of the thin backlight module according to the present invention.

Please refer to FIG. 5 which is a process flow diagram illustrating a manufacturing method of a thin backlight module. As shown in FIG. 5, the manufacturing method of the thin backlight module comprises steps as follows.

S10: providing a drive substrate;

S20: arranging a plurality of light emitting sources on the drive substrate;

S30: developing a fluorescence layer on the light emitting sources, and hot-pressing a plurality of surface micro-structures on a surface of the fluorescence layer, wherein each of the surface micro-structures is disposed corresponding to each of the light emitting sources;

S40: developing a particle micro-structure on each of the surface micro-structures, wherein each particle micro-structure contains particles of a concentration, and each particle micro-structure and each surface micro-structure together form a guiding layer for dispersing light from a corresponding one of the light emitting sources.

In step S20 and step S30, the light emitting source is an ultra-thin surface light emitting source such as a blue light mini-LED array. A stencil process is utilized to coat or print an organic silica gel material (ie, the fluorescent layer) containing fluorescent particles on a light emitting surface of a mini-LED. The organic silica gel material forms droplets at the surface of the mini-LED at a high temperature and solidifies during a cooling process, and a light shape (the shape of the light emission) of the mini-LED after the organic silica gel material is solidified into a droplet shape can be expanded more.

In step S30, each of the surface micro-structures is produced using a hot-press mold in such a manner that an inclined surface or a curved surface is defined between a center of each surface micro-structure to the surface of the fluorescence layer, wherein a length from a center of each surface micro-structure to the surface of the fluorescence layer ranges from 50 µm to 500 µm, and a thickness of each surface micro-structure ranges from 5 µm to 100 µm. Specifically, the fluorescent layer is formed by flattening a light transmissive material (e.g. an organic silica gel or the like) through a hot-pressing process, and each surface micro-structure is produced using a hot-press mold, wherein the light transmissive material can be doped with the fluorescent particles, quantum dot particles, haze particles, etc. These particles are excited by blue or ultraviolet light to produce green and red light to be mixed into white light.

Furthermore, before step S30, the manufacturing method further comprises developing a plurality of reflecting layers, each of the reflecting layers being formed between each two adjacent ones of the light emitting sources. The reflecting layer can be formed by processes such as evaporation, sputtering, or ion coating, and the reflecting layer is preferably made of metal or alloy thereof. In step S40, a stencil process is employed to coat or print a light transmissive fluid material on the surface micro-structures, wherein a concentration of the light transmissive fluid material ranges from 10% and 90%, and a thickness of each particle micro-structure ranges from 1 µm and 100 µm. The surface of the particle micro-structure can improve the light diffusion effect, and the light transmissive fluid material will solidify after molding.

Each surface micro-structure and each particle micro-structure with haziness together form a guiding layer for scattering light from a corresponding one of the light emitting sources, and the guiding layer can enhance light diffusion and is manufactured in a manner compatible with conventional LED packaging processes, so there is no need to use new manufacturing equipment, which has advantages such as saving production costs, improving brightness efficiency, and realizing a smaller light mixing distance.

The present invention adopts an ultra-thin surface light-emitting source such as a blue light mini-LED array. The organic silica gel material containing fluorescent particles or the like is coated or printed on a light-emitting surface of the mini LED by the stencil process. The organic silica gel material forms droplets on the surface of the mini LED at high temperatures and solidifies during a cooling process. The light shape (the shape of the light emission) of the droplet-shaped mini LED can be expanded more to effectively reduce the thickness of the backlight module.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A thin backlight module, comprising:
   a drive substrate;
   a plurality of light emitting sources, the light emitting sources arranged in an array on the drive substrate;
   a plurality of reflecting layers disposed on the drive substrate, each of the reflecting layers disposed between each two adjacent ones of the light emitting sources;
   a fluorescence layer, a plurality of surface micro-structures disposed on a surface of the fluorescence layer away from the drive substrate, the surface micro-structures disposed in a one-to-one correspondence with the light emitting sources, wherein a center of each surface micro-structure is disposed corresponding to a center of a corresponding one of the light emitting sources, and an inclined surface or a curved surface is defined between the center of each surface micro-structure and the surface of the fluorescence layer;
   a diffusing layer disposed on the fluorescence layer;
   a top coat layer disposed on the diffusing layer; and
   a plurality of particle micro-structures, each of the particle micro-structures disposed corresponding to each of the surface micro-structures, wherein each particle micro-structure and each surface micro-structure together form a guiding layer for dispersing light from a corresponding one of the light emitting sources, the guiding layer is disposed between the fluorescence layer and the diffusing layer, and the light emitting sources are disposed in the fluorescence layer and arranged corresponding to the guiding layer.

2. The thin backlight module according to claim 1, wherein a size of each of the light emitting sources ranges from 100 μm to 1000 μm and a distance between each two adjacent ones of the light emitting sources ranges from 100 μm to 2000 μm.

3. The thin backlight module according to claim 1, wherein each particle micro-structure comprises haze particles of a specific concentration, the concentration ranges from 10% to 90%, and a thickness of each particle micro-structures ranges from 1 μm to 100 μm.

4. The thin backlight module according to claim 1, wherein a length from a center of each surface micro-structure to the surface of the fluorescence layer ranges from 50 μm to 500 μm, and a thickness of each surface micro-structure ranges from 5 μm to 100 μm.

5. The thin backlight module according to claim 1, wherein each of the light emitting sources is a mini LED or a micro LED; the fluorescence layer comprises a light transmissive adhesive and comprises, mixed with the light transmissive adhesive, one selected from a group consisting of a plurality of fluorescent particles, a plurality of quantum dot particles, or a plurality of haze particles; and the drive substrate is a flexible printed circuit board (FPC) or a printed circuit board (PCB).

6. A manufacturing method of a thin backlight module, comprising steps as follows:
   providing a drive substrate;
   arranging a plurality of light emitting sources on the drive substrate;
   producing a plurality of reflecting layers on the drive substrate, wherein each of the reflecting layers is arranged between each two adjacent ones of the light emitting sources;
   providing a diffusing layer on the fluorescence layer;
   providing a top coat layer on the diffusing layer;
   forming a fluorescence layer on the light emitting sources, and hot-pressing a plurality of surface micro-structures on a surface of the fluorescence layer, wherein the surface micro-structures are disposed in a one-to-one correspondence with the light emitting sources, a center of each surface micro-structure is arranged corresponding to a center of a corresponding one of the light emitting sources, and an inclined surface or a curved surface is defined between the center of each surface micro-structure and the surface of the fluorescence layer; and
   forming a particle micro-structure on each of the surface micro-structures, wherein each of the particle micro-structures contains particles of a concentration, each particle micro-structure and each surface micro-structure together form a guiding layer for dispersing light from a corresponding one of the light emitting sources, the guiding layer is arranged between the fluorescence layer and the diffusing layer, and the light emitting sources are arranged in the fluorescence layer and arranged corresponding to the guiding layer.

7. The manufacturing method of the thin backlight module according to claim 6, wherein in step S30, each of the surface micro-structures is produced using a hot-press mold in such a manner that an inclined surface or a curved surface is defined between a center of each surface micro-structure and the surface of the fluorescence layer, wherein a length from the center of each surface micro-structure to the surface of the fluorescence layer ranges from 50 μm to 500 μm, and a thickness of each surface micro-structure ranges from 5 μm to 100 μm.

8. The manufacturing method of the thin backlight module according to claim 6, wherein a stencil process is utilized to coat or print a light transmissive fluid material on each surface micro-structure, wherein the concentration of the particles of each particle micro-structure ranges from 10% to 90%, and a thickness of each particle micro-structure ranges from 1 μm to 100 μm.

* * * * *